(12) United States Patent
Kinsbursky et al.

(10) Patent No.: US 7,507,496 B1
(45) Date of Patent: Mar. 24, 2009

(54) PROCESS FOR RECOVERING LEAD OXIDES FROM EXHAUSTED BATTERIES

(75) Inventors: Steven A. Kinsbursky, Anaheim, CA (US); W. Novis Smith, Philadephia, PA (US); Richard Schutte, Fruitvale (CA)

(73) Assignees: Toxco, Inc, Anaheim, CA (US); Kinsbursky Brothers Inc, Anaheim, CA (US)

( * ) Notice: Subject to any disclaimer, the term of this patent is extended or adjusted under 35 U.S.C. 154(b) by 858 days.

(21) Appl. No.: 11/006,279

(22) Filed: Dec. 7, 2004

(51) Int. Cl.
    H01M 6/50 (2006.01)
    H01M 4/82 (2006.01)
    C01G 21/02 (2006.01)
    C01G 21/10 (2006.01)
    C22B 13/00 (2006.01)
    C22B 13/02 (2006.01)
    C22B 13/06 (2006.01)
    C22B 13/08 (2006.01)
    C01G 21/04 (2006.01)
    C01G 21/06 (2006.01)
    C01G 21/08 (2006.01)

(52) U.S. Cl. ............... 429/49; 423/92; 423/98; 423/619; 29/2

(58) Field of Classification Search .......... None
    See application file for complete search history.

(56) References Cited

U.S. PATENT DOCUMENTS

| 1,148,062 | A | * | 7/1915 | Tucker | 423/98 |
| 1,682,562 | A | * | 8/1928 | Hill | 423/98 |
| 1,915,724 | A | * | 6/1933 | Finkelstein | 423/93 |
| 4,220,628 | A | * | 9/1980 | Striffler et al. | 423/92 |
| 4,229,271 | A | * | 10/1980 | Prengaman et al. | 205/599 |
| 4,460,442 | A | * | 7/1984 | Ducati | 205/599 |
| 5,173,277 | A | * | 12/1992 | Montgomery et al. | 423/92 |
| 5,248,342 | A | * | 9/1993 | Montgomery et al. | 134/7 |
| 5,540,915 | A | * | 7/1996 | Yasuda et al. | 423/620 |
| 5,840,262 | A | * | 11/1998 | Margulis | 423/92 |

OTHER PUBLICATIONS

Answers.com Alkali Definition.*

* cited by examiner

Primary Examiner—Jonathan Crepeau
Assistant Examiner—Robert Hodge
(74) Attorney, Agent, or Firm—John Lezdey & Assoc.

(57) ABSTRACT

A process for recovering lead oxides from the spent paste of exhausted lead acid batteries. The process provides heating the spent paste with an alkali hydroxide solution at elevated temperatures prior to calcinations. Calcination is at various temperatures so that either lead mono-oxide, lead dioxide or red lead is obtained as the principal product. There is also provided the use of the lead oxide to prepare the paste for positive and negative electrodes or other lead compounds.

8 Claims, No Drawings

PROCESS FOR RECOVERING LEAD OXIDES FROM EXHAUSTED BATTERIES

FIELD OF THE INVENTION

The present invention relates to an improved process for the recovery of lead oxides from exhausted batteries. More particularly, the invention relates to an improved process for the recovery of pure lead oxides and related material from a spent paste obtained from exhausted lead-acid batteries and its use in lead acid batteries.

BACKGROUND OF THE INVENTION

Lead acid electrochemical cells which are otherwise known as "lead-acid batteries" are commonly used to store and deliver electrical energy. For example, lead acid electrochemical cells are normally employed in vehicles (e.g. cars, trucks, boats, aircraft, and the like) for ignition, lighting, and other related purposes.

Conventional lead-acid electrochemical cells include electrically-conductive positive and negative current collectors typically manufactured in the form of foraminous (porous) metallic grids which are manufactured from a lead alloy or elemental lead (99.90%-99.990% purity lead) as noted in U.S. Pat. No. 3,951,688. The individual current collectors may be planar (flat) in configuration or spirally-wound. Regardless of form, both the positive and negative current collectors (e.g. grids) are coated with a paste composition that is directly deposited onto both sides of the current collectors during cell production. As a result, positive and negative "plates" are formed from the pasted current collectors. The positive and negative pastes are typically produced from one or more particulate lead-containing compositions which may consist of, for example, lead (Pb) or lead compounds (e.g. oxides such as PbO, $PbO_2$ and/or $Pb_3O_4$ "red lead" The selected lead-containing compositions are then combined with a paste "vehicle" (e.g. water) and various other optional ingredients including sulfuric acid. Other additives of interest comprise expander materials as discussed in U.S. Pat. No. 4,902,532 which include barium sulfate, carbon black, and lignosulfonate. The expander materials are primarily used in connection with the negative paste as discussed further below.

The paste composition positioned on the positive current collector to form the positive plate in an electrochemical cell is typically characterized as the "positive paste", while the paste composition located on the negative current collector to produce the negative plate is known as the "negative paste". Further information regarding these items and other characteristics of battery paste compositions in general are presented in U.S. Pat. No. 4,648,177 which is incorporated herein by reference. Likewise, methods of applying the paste compositions listed above to the positive and negative current collectors are specifically discussed in U.S. Pat. Nos. 3,894,886; 3,951,688 and 4,050,482 which are also incorporated by reference.

In 1915, in the U.S. Pat. No. 1,148,062, a process is described for the recovery of lead from exhausted batteries. According to this patent, extracted spent battery pastes are transformed into lead oxides by calcinations and desulfurization. However, the oxides produced are not of high purity.

According to the U.S. Pat. No. 4,222,769, an extracted spent battery paste is desulfurized and then transformed into metallic lead by roasting in the presence of a carbon reducing agent.

In U.S. Pat. No. 4,769,116, a paste is obtained from exhausted lead-acid batteries and treated with sodium hydroxide to produce a solution of sodium sulfate and a desulfurized paste. Pure metallic lead is further recovered from the desulfurized paste by electrowinning.

U.S. Pat. No. 5,211,818 discloses a process wherein the paste sludge resulting from the exhausted batteries is treated with a solution of ammonium sulfate and the metallic lead constituent is recovered by electrowinning.

International Publication No. WO99/44942 discloses a process of producing lead monoxide from spent lead batteries using fluxing agents and an organic reducer in a calcinations step at a temperature of 400° C.-450° C.

As can be noticed from the brief review, in most of the prior references, the recovered lead from exhausted batteries is in its metallic form and, consequently, has to be further converted to the respective oxides.

SUMMARY OF THE INVENTION

The present invention relates to a process for obtaining substantially pure lead oxides from spent paste obtained from exhausted battery acid pastes. More particularly, the process involves the steps of:

A. treating the spent paste obtained from exhausted lead acid batteries with an alkali hydroxide solution;

B. heating the mixture from step "A" at a temperature between 40° and 100° C.;

C. filtering the mixture of step "B" and washing the filter cake formed with water until the filtrate has a pH of about 9.0 or less, and then D1. heating the filter cake from step "C" to 350-500° C. to form red lead ($Pb_3O_4$), or optionally D2. heating the filter cake from step "C" at a temperature between 650° and 750° C. to obtain substantially pure lead monoxide (PbO), or optionally D3. heating the filter cake from step "C" at 100° to 200° C. to obtain lead dioxide ($PbO_2$).

According to another embodiment of the invention, the lead oxides from the process can be utilized to prepare the negative and/or positive paste current collecting members of a lead acid battery.

It is a general object of the invention to obtain substantially pure lead oxides from spent paste from exhausted lead acid batteries.

It is also an object of the invention to prepare pure lead from spent electrode paste.

It is another object of the invention to prepare positive and/or negative current collectors utilizing the lead oxides obtained by the present invention. It is a further object of the invention to provide an improved process for the recovery of the lead constituents from the paste obtained from exhausted lead batteries.

It is still another object of the invention to provide an economical process for obtaining pure lead oxides from paste obtained from exhausted batteries.

It is yet another object of the invention to obtain lead oxides which can be used in pharmaceutical preparations.

DESCRIPTION OF THE PREFERRED EMBODIMENTS

The present invention provides the recovery of lead oxide constituents from spent paste of exhausted lead acid batteries. According to the present invention, the spent paste is extracted from exhausted lead acid batteries by conventional methods which include crushing the casing of the battery and separating the metallic and/or plastic components from the paste. The paste if desired could be desulfurized by prior art methods.

Initially, the negative and/or positive electrodes from a lead acid battery are crushed and screened to remove the metallic support grid and/or plastic components. The residual material which is the spent paste or cake from the electrodes is added to water and a strong alkali hydroxide solution, preferably between 20 and 70% by weight concentration of solids to bring the pH of the mixture to a pH of at least 10, preferably 14. Preferably, sodium or potassium hydroxide solutions are utilized. The resulting slurry is stirred at elevated temperatures, preferably about 60° to 100° C. The mixture is filtered and the filter cake washed with water until the filtrate has a pH of about 9.0 or less. The damp solid is dried and then calcined in a furnace at a temperature between 100-750° C. depending upon the desired product, i.e. PbO, $PbO_2$ or $Pb_3O_4$. The resulting composition is substantially lead oxide is PbO, $PbO_2$ or $Pb_3O_4$. The composition is preferably cooled under an inert atmosphere (i.e. nitrogen when PbO is obtained).

In order to obtain the desired lead oxide the process involves the following steps:

1) treating spent paste obtained from exhausted lead acid batteries with an alkali hydroxide solution, preferably sodium, potassium or barium hydroxide, at a concentration of about 20 to 60% so as to have a pH of about 10, preferably about 14 and heating the mixture between about 40° to 100° C.;

2) filtering the mixture from step 1) and washing the filter cake formed with water until the filtrate has a pH of about 9.0 or less, and then obtaining the desired lead oxide by one of the following steps:

a) heating the filter cake obtained from step 2) to about 350°-500° C. to obtain read lead ($Pb_3O_4$) or b) heating the filter cake obtained from step 2) to a temperature between about 650 to 750° C. to obtain substantially pure lead mono-oxide, (PbO) or 3) heating the filter cake from step 2) to a temperature between about 100° C. to 200° C. to obtain lead dioxide ($PbO_2$).

It is understood that the spent battery pastes of the anode and cathode can be processed together or separately.

The lead oxides can be further treated by known processes to obtain elemental lead (Pb).

It has been found to be critical to treat the extract from the exhausted lead batteries with an alkali hydroxide prior to calcinating in order to remove the sulfate ions which are present in the spent paste. Also, after treatment with the strong alkali hydroxide, the treated material must be washed to remove any sodium or potassium ions which would remain after calcinations. Accordingly, the resulting composition after calcinations is substantially pure lead oxide (PbO), $PbO_2$ or red lead ($Pb_3O_4$) which can be further processed into a negative and/or positive paste or reacted further to form lead compounds.

The Paste Compositions of the Present Invention

The lead oxide compositions of the present invention can be used to prepare either the positive paste or the negative paste for lead acid battery electrodes. The pastes contain two basic ingredients. These ingredients are 1) the lead oxide compositions of the present invention, and 2) a paste vehicle. The lead oxide compositions will typically have a particle size of about 0.1-10 microns in a representative and non-limiting embodiment. A representative positive paste using PbO or $Pb_3O_4$ or $PbO_2$ will typically include about 3-25% by weight of paste vehicle therein. Water is a representative and preferred material suitable for use as the paste vehicle for both the positive and negative paste.

In addition, the positive paste and/or negative paste can contain sulfuric acid (e.g. about 0.01-18 M), if needed. The sulfuric acid is used in situations where greater paste porosity is desired. The positive and/or negative paste may contain additives or expanders which are known in the art which may improve the consistency or performance of the paste in an amount of about 0-5% by weight.

A typical negative paste of the invention will comprise:

1) about 50%-900% by weight of the lead oxide prepared by the invention, 2) about 0-5% by weight of sulfuric acid, 3) about 0-5% by weight of an expander, and 4) a paste vehicle (water); at a balance to make 100%.

Suitable expander materials typically comprise a mixture of an organic expander, carbon black, and barium sulfate.

Various binders for the negative paste include fibers such as fiberglass, carbon fibers and synthetic plastic fibers.

The following examples are presented in order that those skilled in the art may better understand how to practice the invention. The examples are merely presented by way of illustration only, and are not intended to limit the invention.

EXAMPLE 1

A. A positive electrode from an industrial type lead acid battery was crushed and the metallic support grid removed. The lumpy residual material was broken from the grids and then further crushed and screened through 100 mesh.

B. 33.4 g of the dark red black acidic material from step "A" was added to 38.5 g water and then 7 g of 50% sodium hydroxide solution was added and the pH checked which was 14. The slurry was stirred and heated for 2 hours at 80-90° C. and then cooled and filtered. The pH of the filtrate was still about 14. The filter cake was washed with water until the filtrate was pH of about 8.0 or less. The damp solid was dried at 60-70° C. The dry cake (31.6 g) was repowdered and placed into a furnace and heated to 730° C. for 30 minutes. The orange yellow litharge (PbO) that was formed was removed and cooled in air and weight 29.6 g. Analysis showed <1 ppm antimony; and 0.02% sulfate. The litharge was reheated again in a crucible to 700° C. and then removed and placed into a nitrogen atmosphere to cool. The orange yellow powder immediately turned yellow on cooling under nitrogen and when totally cool was a stable canary yellow powder in air. (This same phenomena was noted with reagent grade litharge which is orange yellow.)

EXAMPLE 2

A. A negative (desulfated) electrode from an industrial type cased lead acid battery was crushed and the metallic support grid removed. The lumpy residual material was then further crushed and screened through 100 mesh.

B. 42.5 g of the gray neutral material from step "A" was added to 44.7 g of water and then 5 g of 50% sodium hydroxide solution was added and the pH checked, which was 14. The slurry was stirred and heated for 2 hours at 80-90° C. and then cooled and filtered. The pH of the filtrate was still about 14. The filter cake was washed until the filtrate was a pH of about 8.0. This damp solid was dried at 60-70° C. The dry cake (41.5 g) was repowdered and placed into a furnace and heated to 700° C. for 25 minutes. An orange yellow litharge (PbO) was removed and cooled under nitrogen. The cooled yellow powder obtained weighted 39.0 g. Analysis showed <1 ppm antimony; and 0.07% sulfate.

EXAMPLE 3

A. A mixture of the negative (desulfated) electrodes and the positive electrodes from the same industrial type lead acid batteries was crushed and the metallic support grids removed. The lumpy residual material was then further crushed and screened through 100 mesh.

B. 56 g of the dark red neutral material obtained from part "A" was added to 59.1 g water and then 7.0 g of 50% sodium hydroxide solution was added and the pH checked, which was 14. The slurry was stirred and heated for 2 hours at 80-90° C. and then cooled and filtered. The pH of the filtrate was still about 14. The filter cake was washed with water until the filtrate was a pH of about 8.0. This damp solid was dried at 60-70° C. The dry cake (55. g) was repowdered and placed into a furnace and heated to 700° C. for 25 minutes. An orange yellow litharge (PbO) was removed and cooled under nitrogen. The cooled yellow powder obtained weighted 48.0 g. Analysis showed 2882 ppm antimony; and 0.02% sulfate. (The higher antimony was due to some of the grid material which contains antimony being broken off and in the electrode material.)

EXAMPLE 4

A negative electrode was prepared by mixing 100% of the lead oxide from Example 1, 0.25% lignosulfonate (solid) and 0.15% carbon black (solid) with 13.77% water for ten minutes with 0.8% barium hydroxide.

6.20% sulfuric acid (50% concentration) was then added and mixed for 15 minutes. The paste temperature reached about 50-60° C. A uniform negative paste was produced. The paste was then applied to a lead alloy grid followed by curing of the grid at 40-50° C. for 48 to 72 hours. The cured grid could then be used in forming a battery.

EXAMPLE 5

A. Preparation of $Pb_3O_4$: The positive electrode from an industrial type metal cased lead acid battery was crushed and the metallic support grid removed. Lumpy residual material was then further crushed and screened through 100 mesh. 40 g of dark red black acidic material was added to 40 g water and then 7 g of 50% sodium hydroxide solution was added and the pH checked, which was 14. The slurry was stirred and heated for 1 hour at 70-80° C. and then cooled and filtered. The pH of the filtrate was still about 14. The filter cake was washed until the filtrate was less than pH 8. This damp red black solid was placed into a furnace and heated to 430° C. and held for 45 minutes. The red lead ($Pb_3O_4$) removed and cooled in air and weight 37 g. Analysis showed <1 ppm antimony; and 0.02% sulfate.

EXAMPLE 6

A. Preparation of lead dioxide: The positive electrode from a stationary steel cased lead acid battery was crushed and the metallic support grid removed. Lumpy residual material was then further crushed and screened through –100 mesh. 40 g of dark red black acidic material was added to 40 g water and then 7 g of 50% sodium hydroxide solution was added and the pH checked, which was 14. The slurry was stirred and heated for one hour at 70-80° C. (optionally 5% by weight hydrogen peroxide could be added at this point). Then the solution was cooled and filtered. The pH of the filtrate was still about 14. The filter cake was washed until the filtrate was about pH 8. This damp solid was placed into a furnace and heated to 100-200° C. for one hour. The black lead dioxide ($PbO_2$) removed and cooled in air and weight 38 g. Analysis showed <1 ppm antimony; and 0.02% sulfate.

EXAMPLE 7

A. Preparation of red lead: A mixture of the negative electrodes and the positive electrodes from the same lead acid batteries were crushed and the metallic support grid removed. Lumpy residual material was then further crushed and screened through 100 mesh. 60 g of this dark red neutral material was added to 60 g water and then 7.0 g of 50% sodium hydroxide solution was added and the pH checked which was 14. The slurry was stirred and heated for one hour at 70-80° C. and then cooled and filtered. The pH of the filtrate was still about 14. The filter cake was washed with water until the filtrate was about 7.5. This damp solid was placed into a furnace and heated to 400° C. for one hour. The red lead ($Pb_3O_4$) removed and cooled in air. The cooled orange red powder weighed 58.0 g. Analysis showed less than 0.100 ppm antimony; and 0.02% sulfate.

In the following examples, 8-11, the cathodes and the anodes were kept separate after recovering from commercial lead acid battery assemblies such as those for uninterruptible power supplies, telephone backup, and mobile utility equipment. The cathode and anode paste materials were freed from their respective metallic grids and then resulting separate cathode and anode paste materials were ground to prepare all anode feed and an all cathode feed.

EXAMPLE 8

100 g of the dry cathode powder (from lead acid telephone batteries) was mixed with 100 g of water and 17.5 g of 50% sodium hydroxide was added. The pH was 14. The slurry was stirred and heated at 70-80° C. for one hour. The slurry was cooled and filtered. The pH of the filtrate was still 14. The filter cake was washed with distilled water until the washes had a pH less than 8. The damp cake was dried in the oven at 80° C. and the deep brown powder weighed 86 g. This material was the color and appearance of $PbO_2$. The cake (was powdered) and 16 g were placed in a ceramic crucible and heated at 486° C. for one hour. The crucible was immediately placed in a desiccator to cool under nitrogen. The powder weighed 16 g and therefore no change in weight. The color was that of red lead, $Pb_3O_4$.

EXAMPLE 9

100 g of the dry cathode powder (from steel cased lead acid batteries) was mixed with 100 g of water and 16.5 g of 50% sodium hydroxide was added. The pH was 14. The slurry was stirred and heated at 70-80° C. for one hour. The slurry was cooled and filtered. The pH of the filtrate was still 14. The filter cake was washed with distilled water until the washes had a pH less than 8. The camp cake was dried in the oven at 80° C. and the deep reddish black brown powder weighed 82.4 g. This material was the color and appearance of $PbO_2$. The cake (was powdered) and 17 g were placed in a ceramic crucible and heated at 486° C. for one hour. The crucible was immediately placed in a desiccator to cool under nitrogen. The powder weighed 17 g and therefore no change in weight. The color was that of red lead, $Pb_3O_4$.

EXAMPLE 10

100 g of the dry anode powder (from lead acid telephone batteries) was mixed with 100 g of water and 26 g of 50% sodium hydroxide was added. The pH was 14. The slurry was stirred and heated at 70-80° C. for one hour. The solution was cooled and filtered. The pH of the filtrate was still 14. The filter cake was washed with distilled water until the washes had a pH less than 8. The damp cake was dried in the oven at 70-80° C. and weighed 95. The cake (was powdered) was the yellow gray of leady lead oxide. 20 g of this material were placed in a ceramic crucible and heated at 350° C. for one hour. The crucible was immediately placed in a desiccator to cool under nitrogen. The powder weighed 19.5 g and therefore essentially no change in weight. The yellow color was that of litharge, PbO.

EXAMPLE 11

A. 100 g of the dry anode powder (from lead acid steel cased batteries) was mixed with 100 g of water and 23 g of 50% sodium hydroxide was added. The pH was 14. The slurry was stirred and heated at 70-80° C. for one hour. The solution was cooled and filtered. The pH of the filtrate was still 14. The filter cake was washed with distilled water until the washes had a pH less than 8. The damp cake was dried in the oven at 70-80° C. and weighed 86 g. The cake (was powdered) was the yellow gray of leady lead oxide. 20 g of this material were placed in a ceramic crucible and heated at 350° C. for one hour. The crucible was immediately placed in a desiccator to cool under nitrogen. The powder weighed 20 g and therefore essentially no change in weight. The yellow color was that of litharge, PbO.

B. Eight grams each of the cleaned anode and the cleaned cathode material (after base wash and drying) were combined and heated at 486° C. for one hour and cooled under nitrogen to yield 16 g of red lead, $Pb_3O_4$. This demonstrates that separate or mixed the same results will occur.

While preferred embodiments have been shown and described, various modifications and substitutions may be made thereto without departing from the scope and spirit of the invention.

What is claimed is:

1. A process for separating and producing lead oxides in a substantially pure state from spent paste obtained from exhausted lead acid batteries, which comprises the steps of:
   A) treating spent paste obtained from exhausted lead acid batteries with an alkali hydroxide solution,
   B) heating the mixture obtained from step "A" at a temperature between 40-100° C.,
   C) filtering the mixture from step "B" and washing the filter cake formed with water, and then
   D) heating the filter cake from step "C" at a temperature in increments between 350-500° C. and red lead is obtained.

2. The process of claim 1 wherein the filter cake of step "C" is washed with water until a pH of about 9.0 or less is obtained.

3. The process of claim 1 wherein the alkali hydroxide solution in step "A" is selected from the group consisting of sodium hydroxide and potassium hydroxide.

4. The process according to claim 1 wherein the concentration of the alkali hydroxide solution used is between 20-60%.

5. The process of claim 1 wherein the pH of the spent paste of step "A" is brought to a pH of at least 10.

6. The process of claim 5 wherein the pH is 14.

7. The process of claim 1 wherein the spent battery paste of the anode is kept separate and processed separately.

8. The process of claim 1 wherein the spent battery paste of the cathode is kept separate and processed separately.

* * * * *